US006920376B2

(12) United States Patent
Jouppi et al.

(10) Patent No.: US 6,920,376 B2
(45) Date of Patent: Jul. 19, 2005

(54) MUTUALLY-IMMERSIVE MOBILE TELEPRESENCE SYSTEM WITH USER ROTATION AND SURROGATE TRANSLATION

(75) Inventors: Norman Paul Jouppi, Palo Alto, CA (US); Vaughan Stanton Thomas, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 10/285,726

(22) Filed: Oct. 31, 2002

(65) Prior Publication Data
US 2004/0088077 A1 May 6, 2004

(51) Int. Cl.[7] .......................... G05B 15/00; G05B 19/00
(52) U.S. Cl. ...................... 700/259; 700/245; 700/246; 700/250; 700/251; 700/257; 700/258; 700/262; 348/159; 982/103
(58) Field of Search .............................. 700/245, 246, 700/250, 251, 253, 257–259, 262; 348/159, 103

(56) References Cited

U.S. PATENT DOCUMENTS

| 6,292,713 | B1 | | 9/2001 | Jouppi et al. | |
|---|---|---|---|---|---|
| 6,666,374 | B1 | * | 12/2003 | Green et al. | 235/379 |
| 6,726,096 | B1 | * | 4/2004 | Green et al. | 235/379 |
| 6,726,476 | B2 | * | 4/2004 | Jung et al. | 433/26 |
| 6,727,935 | B1 | * | 4/2004 | Allen et al. | 348/14.03 |
| 6,785,402 | B2 | * | 8/2004 | Jouppi et al. | 382/103 |
| 2002/0057279 | A1 | * | 5/2002 | Jouppi | 345/619 |
| 2002/0063726 | A1 | * | 5/2002 | Jouppi | 345/660 |
| 2002/0118861 | A1 | * | 8/2002 | Jouppi et al. | 382/103 |
| 2002/0173877 | A1 | * | 11/2002 | Zweig | 700/245 |
| 2003/0209893 | A1 | * | 11/2003 | Breed et al. | 280/735 |
| 2004/0008423 | A1 | * | 1/2004 | Driscoll et al. | 359/725 |
| 2004/0027451 | A1 | * | 2/2004 | Baker | 348/46 |
| 2004/0088077 | A1 | * | 5/2004 | Jouppi et al. | 700/245 |
| 2004/0088078 | A1 | * | 5/2004 | Jouppi et al. | 700/245 |
| 2004/0117067 | A1 | * | 6/2004 | Jouppi | 700/245 |

OTHER PUBLICATIONS

Jouppi, First steps towards mutually–immersive mobile telepresence, 2002, Internet, pp. 1–10.*
Kusuoka et al., Dual ecologies of robot as communication media: Thoughts on coordinating orientations and projectability, 2004, Internet, pp. 183–190.*
Jouppi et al., A first generation mutually–immersive mobile telepresence surrogate with automatic backtracking, 2004, IEEE, pp. 1670–1675.*
HP Labs: News, BiReality Audio–Video Demo, First steps toward a mutually immersive mobile telepresence, 2002, Internet, pp. 1–2.*
Braunl et al., Improv and EyeBot real–time vision on–board mobile robots, 1997, IEEE, pp. 131–135.*
Lobo et al., Integration of inertial information with vision towards robot autonomy, 1997, IEEE, pp. 825–830.*

* cited by examiner

Primary Examiner—Thomas G. Black
Assistant Examiner—McDieunel Marc

(57) ABSTRACT

A system and method of mobile telepresencing includes providing a surrogate capable of viewing outward and of translational movement, displaying the views outward for a user and sensing rotation of a user in a direction of a view outward and a user translation instruction for causing translation of the surrogate in the direction relative to the view outward.

20 Claims, 4 Drawing Sheets

MUTUALLY-IMMERSIVE MOBILE TELEPRESENCE SYSTEM WITH USER ROTATION AND SURROGATE TRANSLATION

CROSS-REFERENCE TO RELATED APPLICATION

The present application contains subject matter related to a concurrently filed U.S. patent application by Norman Paul Jouppi and Vaughan Stanton Thomas entitled "Telepresence System with Automatic User-Surrogate Height Matching". The related application is assigned to Hewlett-Packard Development Company, L.P. is identified by docket number 200208643-1, and is incorporated herein by reference thereto.

BACKGROUND

1. Technical Field

The present invention relates generally to robotics and more specifically to telepresence systems.

2. Background Art

In the past, video camera and audio systems were developed for improving communication among individuals who are separated by distance and/or time. The systems and the process are now referred to as "videoconferencing". Videoconferencing sought to duplicate, to the maximum extent possible, the full range, level and intensity of interpersonal communication and information sharing which would occur if all the people or meeting participants were "face-to-face" in the same room at the same time.

In robotic telepresence, a remotely controlled robot simulates the presence of a user. The overall experience for the user and the participants interacting with the robotic telepresence device is similar to videoconferencing, except that the user has a freedom of motion and control over the robot and video input that is not present in traditional videoconferencing. The robot platform typically includes a camera, a display device, a motorized platform that includes batteries, a control computer, and a wireless computer network connection. An image of the user is captured by a camera at the user's location and displayed on the robotic telepresence device's display in the surrogate's location.

The position of a person can be considered as the combination of two components: their position in an x,y plane (and z if multistory buildings are considered), and the direction a person is facing (e.g., an orientation angle relative to compass headings). As part of recreating the experience of being in a surrogate's location it is desirable to allow the user to control their position at the surrogate's location as immersively as possible.

Unfortunately, teleoperated mechanical motion is slower than that achievable by a physically present person for several reasons.

First, the communication and computational delays between the user and the surrogate mean that if the surrogate moves quickly it is likely to overshoot the desired motion of the user. For example, the user may command the surrogate to stop rotation when the user sees the desired heading has been achieved at the surrogate's location. However, the video display to the user is delayed by a significant fraction of a second over reality, and it also takes a significant fraction of a second to send the commands from the user to the surrogate and for them to take effect. If the surrogate is rotating at human speeds (e.g., 180 degrees a second), combined round-trip delays of only one-half second can result in an overshoot of 90 degrees.

Second, surrogates tend to be heavier than a person and so have more inertia. Thus it requires a lot of power to accelerate and decelerate them quickly.

Third, rapid teleoperated motion requires more automatic safety safeguards to avoid injury or damage to persons or property.

Previous teleoperated surrogates have required remote rotation of the surrogate body for steering when moving to new locations, and remote rotation of the surrogate's head for changing the orientation of the user's head at the surrogate's location.

This suffers from the feedback lag problem and other problems mentioned above.

Solutions to problems of this sort have been long sought, but have long eluded those skilled in the art.

DISCLOSURE OF THE INVENTION

The present invention provides a system and method of mobile telepresencing includes providing a surrogate capable of viewing outward and of translational movement, displaying the views outward for a user and sensing rotation of a user in a direction of a view outward and a user translation instruction for causing translation of the surrogate in the direction relative to the view outward. Because teleoperated mechanical motion is slow and unimmersive, it is minimized to enhance immersion. The present invention eliminates one class of teleoperated mechanical motion by allowing rotations to take place at the user's location instead of at the surrogate's location. The present invention also provides a novel natural interface for controlling translational motion at the surrogate's location.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

The present invention relates to a Mutually-Immersive Mobile Telepresence (E-Travel) System. The robot device may have a humanoid as well as a non-humanoid shape, and is referred to as a "surrogate". A user sits in a room showing the surrogate's location and the surrogate is located at a remote location. Video and audio are transmitted between the display and the surrogate so that the user sees views radially outward and 360 degrees around from the center of the surrogate to have the feeling of being present at the remote location by seeing it in a surround view and the people or meeting participants at the remote location have the feeling that the user is present by display panels on the surrogate showing images of the head of the user; i.e., the feeling of telepresence.

The user sits or stands inside a display cube, with rear-projection surfaces on the front, back, sides, and optionally the ceiling showing the surrogate's location. Since the goal is to be mutually immersive, live color video images of the user centered on the user's head are acquired from all four sides of the user's location for transmission to the surrogate's location concurrent with projection of live color video surround from the surrogate's location on the four sides of the display cube surrounding the user. The user can move about inside the display cube, so head tracking techniques are used to acquire pleasingly cropped color video images of the user's head in real time.

Figure 1A:
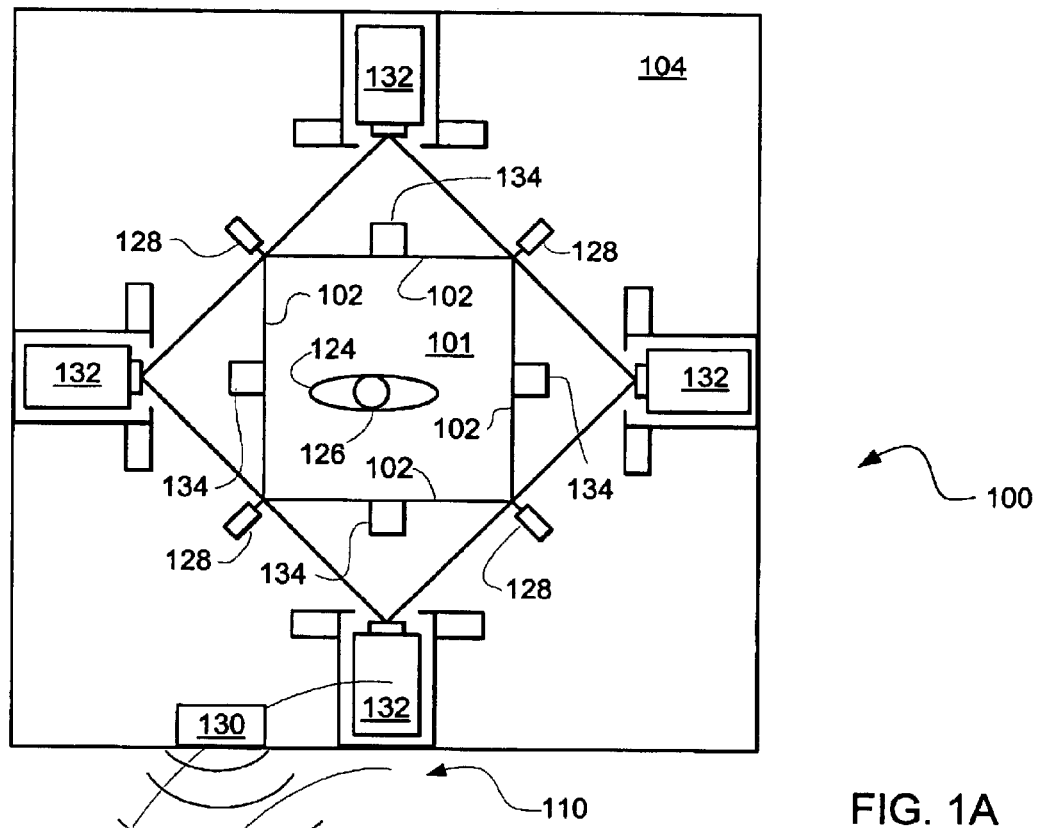
FIGS. 1A and 1B show a Mutually-Immersive Mobile Telepresence (E-Travel) System.
Figure 1B:
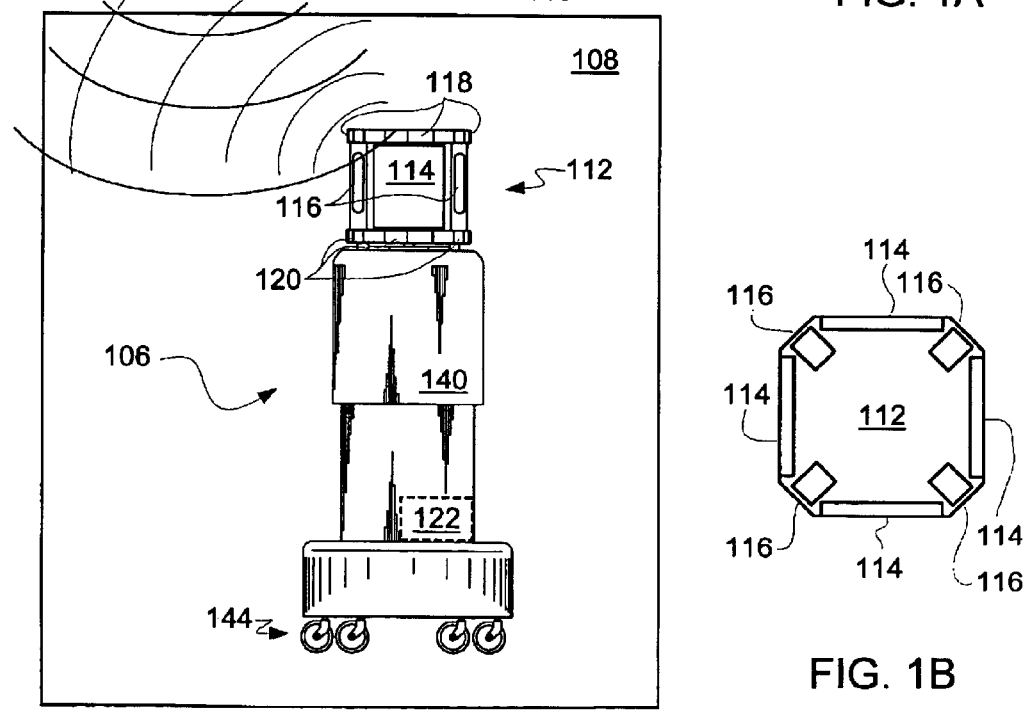

Referring now to FIGS. 1A and 1B, therein are shown a Mutually-Immersive Mobile Telepresence (E-Travel) System 100, which includes a display cube 101 at a user's location 104 and a surrogate 106 at a surrogate's location 108. The surrogate 106 is connected to the display cube 101 via a high-speed network 110.

The surrogate 106 has a surrogate's head 112 including a number of head display panels 114, such as four LCD panels. One or more cameras, such as four surrogate's cameras 116, are positioned in the corners of the surrogate's head 112 to view and capture 360 degrees surround live video at the surrogate's location 108 for display on the display cube 101. One or more microphones, such as four directional surrogate's microphones 118, are positioned in the top corners of the surrogate's head 112 to capture sounds 360 degrees around the surrogate 106. One or more speakers, such as the four surrogate's speakers 120 are also positioned in the bottom corners of the surrogate's head 112 to provide directional audio of the user's voice.

The surrogate 106 contains surrogate's computer/transceiver systems 122 connecting the surrogate's cameras 116, the surrogate's microphones 118, and the surrogate's speakers 120 with the display cube 101 for a user 124. The surrogate's computer/transceiver systems 122 also receive live video views of the user's head 126 from user's camera arrays 128 at the four corners of the display cube 101 and display the live video views on the head display panels 114 in the surrogate's head 112.

The display cube 101 at the user's location 104 receives the video and audio signals at user's computer/transceiver systems 130. The video view from the four surrogate's cameras 116 in the surrogate's head 112 are projected on projection screens 102 of the display cube 101 by four user's projectors 132.

User's speakers 134 are mounted above and below each projection screen 102. By driving each pair of user's speakers 134 with equal volume signals the sound appears to come from the center of each of the projection screens 102 to provide directional audio or hearing of one or more participants from the four surrogate's microphones 118.

The user's computer/transceiver systems 130, which can be placed in an adjacent room (for sound isolation purposes), drive the user's speakers 134 with audio information transmitted from the surrogate 106 at the surrogate's location 108.

The images on the projection screens 102 are presented "life size". This means that the angle subtended by objects on the projection screens 102 is roughly the same angle as if the user 124 was actually at the surrogate's location 108 viewing it personally. However, it will be understood that the reproduction is not exact unless the user's head is centered in the display cube 101. However, the present invention is still an improvement since images are not presented at "life size" in conventional videoconferencing systems.

In the past, surrogates used to be rectangular boxes or non-circularly shaped, such as ovals. Thus, a turning radius was required and there was a concern that a non-circular shaped surrogate would be able to go through a doorway or passageway in one orientation, but would get wedged or stuck if its longer dimension was larger than the gap in the doorway or passageway. However, to have full surrogate mobility, it appeared that remote translation and remote rotation capabilities were required of surrogates. The term "translation" herein means linear movement of the surrogate 106 and the term "rotation" herein means turning movement of the surrogate 106.

After much study, it was discovered the problems inherent in surrogate rotation could be overcome by an actual user rotation and a virtual surrogate rotation. If the user 124 desires to change the orientation of their body with respect to the surrogate's location 108, they may do so by rotating their own physical body at the user's location 104 and having the surrogate 106 remain stationary but the head display panels 114 on the surrogate 106 show the user's head 126 turning to face the desired direction without movement or a rotation of the surrogate 106.

The surrogate 106 has a surrogate's body 140, which is rotationally (circularly) symmetric and has no front, back or sides (i.e., the base and body of the surrogate 106 are cylindrical). Furthermore, the surrogate 106 uses a mechanical drive system 144 that can travel in any translational direction without a need for rotation of the surrogate's body 140.

It has also been discovered that creating a very natural interface for controlling the surrogate's translation at the surrogate's location can even further simulate the feeling of immersion.

First, the angle of the user's hips in the horizontal plane is tracked (i.e., yaw). Users are used to moving perpendicular to the plane of their hips in conventional bipedal motion. The orientation of the user's hips can be captured by the use of several different of techniques. This eliminates communication and computational delays from the feedback loop of the user manually determining how far to rotate.

Second, the speed control of the forward motion of the surrogate 106 in any linear direction is accomplished by the use of a hand-held speed control, such as a commercially available variable-grip device as is common in toy slot car racing. The more the user 124 squeezes the grip, the faster the surrogate 106 will move in the direction perpendicular to the user's hips relative to the view projected from the surrogate's location 108. Backwards motion is not allowed because it is relatively unsafe and uncommonly used. If the user 124 desires to go to a location behind them, they can turn in place in the display cube 101 and go forward from there.

Figure 2:
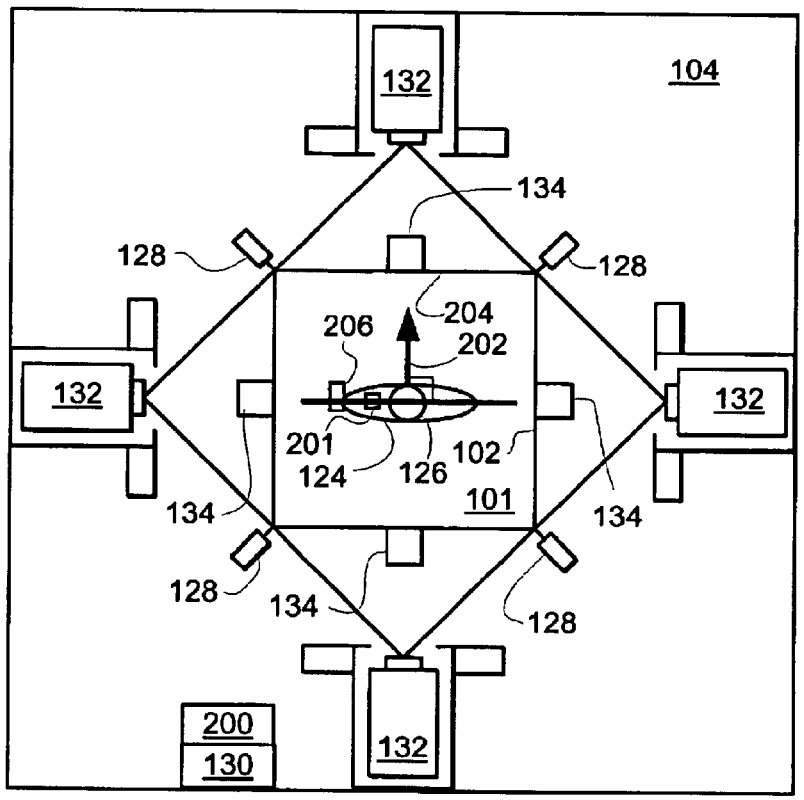
FIG. 2 shows a display cube and a position/orientation measuring system.

Referring now to FIG. 2, therein is shown the display cube 101 and a position/orientation measuring system 200, which includes a hip position sensor 201 worn like a small wireless lapel microphone transmitter by the user 124 indicating the line of the user's hips. The hip position sensor 201 is a tracking sensor capable of accurate, low-latency 3D motion tracking and digitizing over a fairly wide range. The position/orientation measuring system 200 accurately computes the position and orientation of the hip position sensor 201 as it moves through space and provides dynamic, real time, six degree-of-freedom measurement of position (X, Y, and Z Cartesian coordinates) and orientation (azimuth, elevation, and roll). In one embodiment, the hip position sensor 201 is an AC magnetic tracking sensor such as a Polhemus Fastrak available from Polhemus Incorporated of Colchester, Vt. 05446.

An arrow 202 indicates the direction that the user 124 is facing, which is perpendicular to the hip line of the user 124. The user 124 in FIG. 2 faces one of the projection screens 102 designated as a projection screen 204 and holds a forward motion control 206.

It will be noted that by using the hip position sensor 201, it is possible for a user 124 to converse with a person at the surrogate's location 108 while using the surrogate 106 to walk with the person. The user 124 may turn their head to look at the person while continuing to steer forward with their hips. This would not be possible if the user's head position was used to steer the direction of the surrogate 106.

Figure 3:
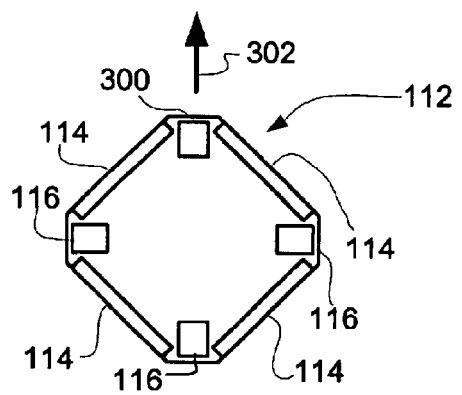
FIG. 3 shows the surrogate's head.

Referring now to FIG. 3, therein is shown the surrogate's head 112 containing the surrogate's cameras 116, including the camera pointed forward designated as a surrogate's camera 300 viewing along an arrow 302. The view along the arrow 302 is projected on the projection screen 204 of FIG. 2.

The user's face in half profile will be shown in half-profile on the surrogate's head display panels 114 on either side of the surrogate's camera 300.

Figure 4:
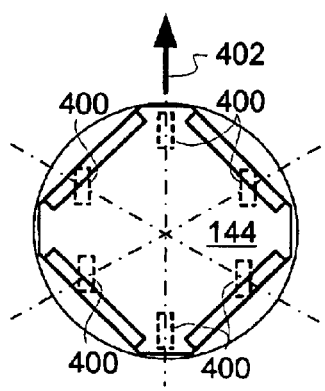
FIG. 4 shows an exemplary surrogate wheel configuration.

Referring now to FIG. 4, therein is shown an exemplary wheel configuration for a surrogate 106 having six wheels 400 set to go in the direction 402, which is in the direction that the surrogate's camera 300 of FIG. 3 is pointed.

With reference to FIGS. 1–4, in the system 100, the orientation of the surrogate's cameras 116 of FIG. 3 is fixed relative to the surrogate's base. The heading of the user's hips is known relative to the display cube 101 from the motion capture device. Furthermore, the surrogate's cameras 116 and 300 are always oriented towards the center of the image projected on the corresponding projection screen 102. The surrogate's computer/transceivers 122 controlling the surrogate wheels' steering orientation makes sure they are aimed to correspond to the perpendicular to the plane of the user's hips. This is accomplished with only a one-way communication delay with translation speed instructions being given by the forward motion control 206.

As an example, if the user 124 orients his/her hips perpendicular to an open doorway visible at the center of the projection screen 204 of FIG. 2, this corresponds to the actual door at the surrogate's location 108 directly in front of the surrogate's camera 300. Thus, the system 100 will aim the wheels 400 in the direction of the open doorway at the surrogate's location 108. It should be noted that the actual heading is based on the direction in which the surrogate's camera 300 is actually pointed.

As a further example, if the perpendicular to the plane of the user's hips points 11 degrees to the left of the center of the projection screen 204, when the surrogate 106 translates, it will move in a direction 11 degrees to the left of the corresponding camera 300.

In a more advanced system, the surrogate's head 112 may also be able to be rotated by the user 124. This is useful for rotating the camera platform when an important high-resolution object at the surrogate's location 108 falls in the corners of the display cube 101, making it difficult to see. If the user 124 can rotate the surrogate's head 112 by at least 45 degrees, the display of remote objects may be shifted from a corner of the display cube 101 to the center of one of the projection screens 102. In this case, the wheels 400 of the surrogate 106 must still be steered relative to the surrogate's cameras 116 and 300 on the surrogate's head 112. This means that the angle of the surrogate's head 112 relative to the surrogate's body must be accurately known, and when it changes the steering angle of the wheels 400 must change as well.

It will be understood from the above disclosure, the steering angle of the wheels 400 in the surrogate base is only important when the surrogate 106 is in translational motion. Thus, to save power and reduce noise and vibration while the surrogate 106 is at a fixed x,y location, the steering angle of the wheels 400 may be left unchanged until the surrogate begins translational motion (i.e., a "lazy" update policy).

Figure 5:
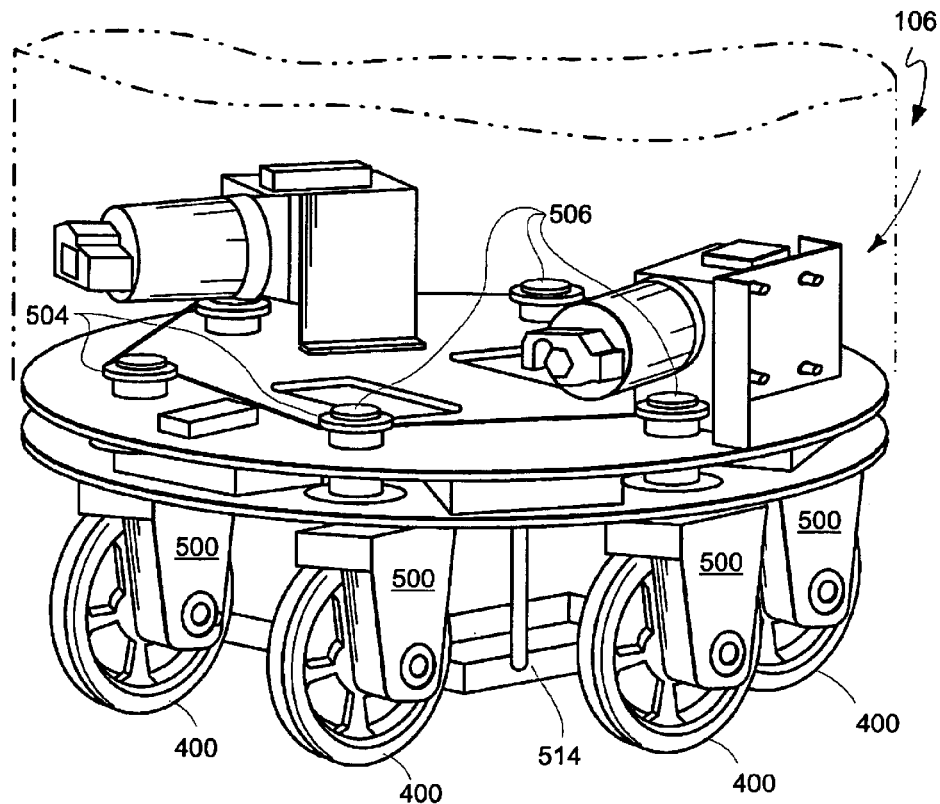
FIG. 5 shows an exemplary surrogate synchronous drive base.

Referring now to FIG. 5, therein is shown one embodiment of the surrogate 106 using a steerable drive arrangement 500 for accomplishing translation in any direction at the surrogate's location 108 without rotation of the surrogate 106 itself. The steerable drive arrangement 500 uses 6 wheels 400 (four shown). This provides enhanced stability over previous bases with 3 wheels. The wheels 400 are made large enough to surmount the largest vertical discontinuity allowed by the Americans with Disabilities Act. Each wheel 400 can be steered through the use of a steering sprocket 504 and can be driven through a drive sprocket 506. All the wheels 400 are tied together by steering and drive chains so that they always face the same direction and rotate at the same speed. The wheels 400 are housed inside a cylindrical fairing (not shown), so that they are not easily visible to participants at the surrogate's location 108.

The user 124 using the surrogate 106 appears to glide over the floor in the direction that their video images are facing. When they turn and move in another direction, their video images show the rotation of their head to a new orientation on the displays of the surrogate (assuming their head and hips are aligned). However, only the wheels of the surrogate under the fairing rotate and not the body of the surrogate. Rotation of wheels about their steering axis encounters much less inertia than rotating the whole surrogate's body, and also requires less energy.

A support 514 hangs down from the center of the lower plate for supporting a battery (not shown).

Figure 6:
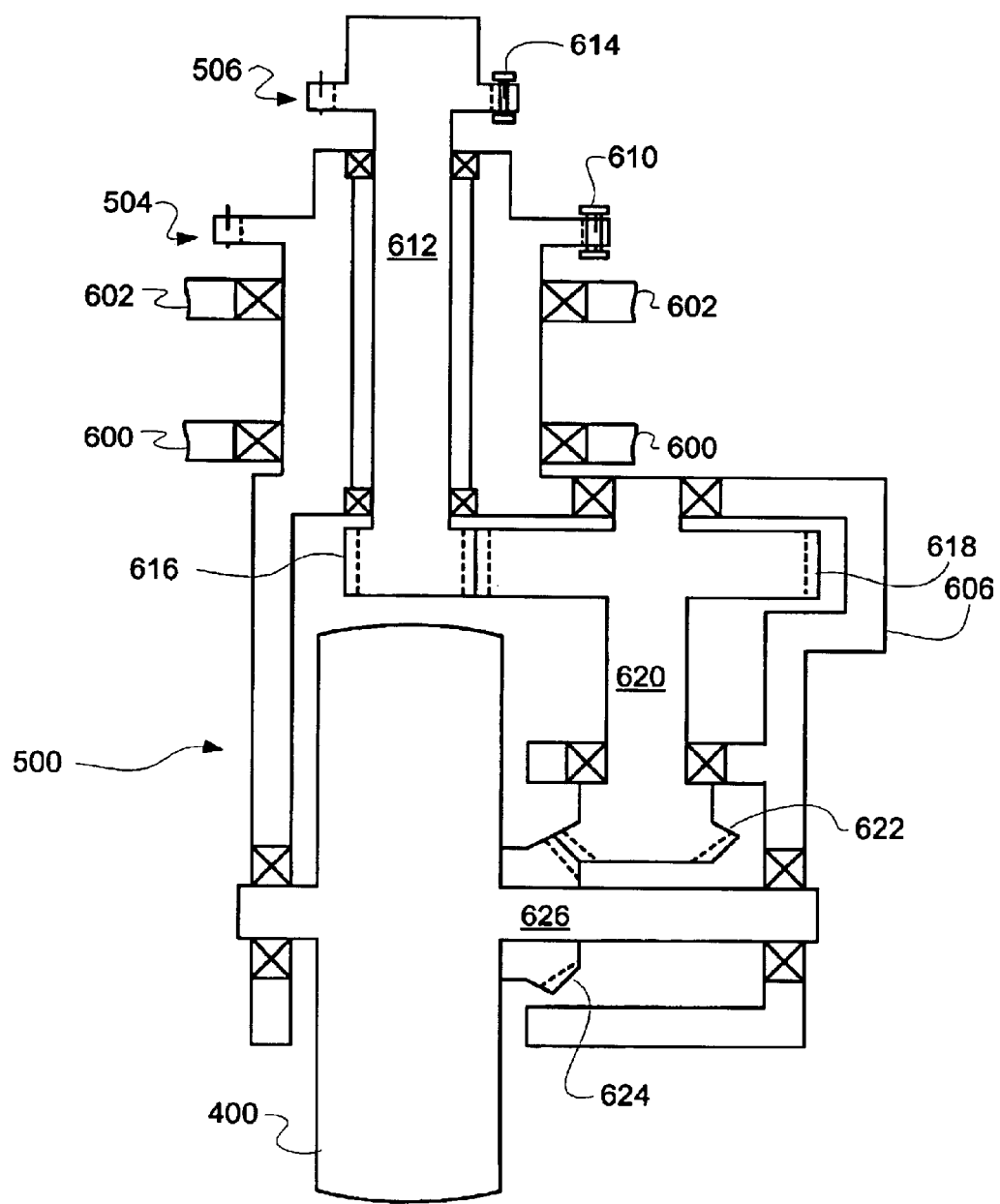
FIG. 6 shows a simplified cross-section of one of the drive wheels of the mechanical drive system of FIG. 1A.

Referring now to FIG. 6, therein is shown a simplified cross-section of the steerable drive arrangement 500 of FIG. 5 of the mechanical drive system 144 of FIG. 1A. The steerable drive arrangement 500 is rotatably mounted in and supports a lower frame 600 and an upper frame 602. A steering chain 610 causes the steering housing 606 and the wheel 400 to turn in the lower frame 600 and the upper frame 602 in synchronization.

Carried concentrically inside the steering sprocket 608 and the steering housing 606 is a first drive shaft 612 having the drive sprocket 506 on top and a first spur gear 616 at the bottom. The drive sprocket 506 is driven by a drive chain 614, which synchronizes all the wheels 400 for translation. The first spur gear 616 drives a second spur gear 618 at the top of a second drive shaft 620. The bottom of the second drive shaft 620 has a first bevel gear 622, which drives a wheel bevel gear 624. The wheel bevel gear 624 is secured to a wheel drive shaft 626 to which the wheel 400 is affixed to drive it synchronously with the other wheels 400 by virtue of the drive chain 614.

Figure 7:
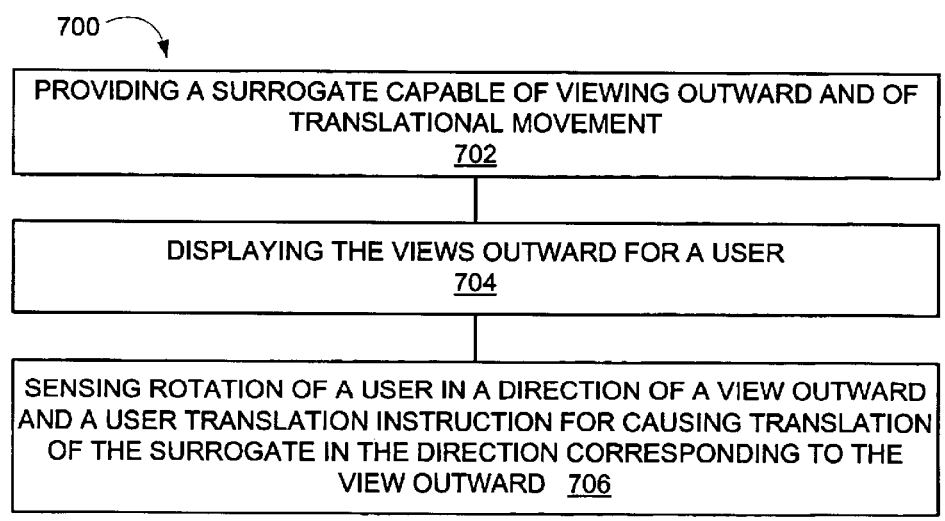
FIG. 7 shows a method of mobile telepresencing.

Referring now to FIG. 7, therein is shown a method 700 of mobile telepresencing including: a block 702 of providing a surrogate capable of viewing outward and of translational movement; a block 704 of displaying the views outward for a user; and a block 706 of sensing rotation of a user in a direction of a view outward and a user translation instruction for causing translation of the surrogate in the direction relative to the outward view.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method of mobile telepresencing comprising:
   providing a surrogate capable of providing views outward and of movement in translation;
   displaying the views outward for a user; and
   sensing rotation of a user in a direction of a view outward and a user translation instruction for causing the translation of the surrogate in the direction relative to the view outward.

2. The method as claimed in claim 1 additionally comprising:
   controlling the speed of translation of the surrogate.

3. The method as claimed in claim 1 additionally comprising:
   viewing the user;
   displaying a view of an image of the head of the user on the surrogate; and
   determining hip line direction of the user to determine the direction of translation of the surrogate.

4. The method as claimed in claim 1 additionally comprising:
   providing the surrogate includes providing a surrogate's camera for viewing outward; and
   moving an angle of the surrogate's camera relative to the direction of translation of the surrogate.

5. The method as claimed in claim 1 wherein:
   sensing rotation of the user includes a lazy update policy for steering applied before beginning translation of the surrogate.

6. A method of mobile telepresencing comprising:
   providing a surrogate capable of providing views outward 360 degrees and of movement in translation;
   displaying the views outward 360 degrees for a user;
   determining the hip line direction of a user; and
   sensing rotation of the hip line direction of the user in a direction perpendicular to a view outward and a user translation instruction for causing the translation of the surrogate in the direction relative to the view outward perpendicular to the hip line direction of the user.

7. The method as claimed in claim 6 additionally comprising:
   controlling the forward speed of translation of the surrogate.

8. The method as claimed in claim 6 additionally comprising:
   viewing the user;
   isolating a view of the head of the user;
   displaying the view of an image of the head of the user on the surrogate; and
   determining hip line direction of the user to determine the direction of translation of the surrogate.

9. The method as claimed in claim 6 additionally comprising:
   moving an angle of the surrogate's cameras relative to the direction of translation of the surrogate.

10. The method as claimed in claim 6 wherein:
    sensing rotation of the user includes a lazy update policy for steering applied before beginning translation of the surrogate.

11. A mobile telepresence system for a user comprising:
    a surrogate having a plurality of surrogate's cameras with outward views, the surrogate having a steerable drive arrangement for movement in translation;
    a display screen for displaying the outward views of the surrogate's cameras; and
    a mechanism responsive to rotation of the user in a direction of an outward view on the display screen and a user translation instruction for turning the steerable drive arrangement and causing the translation of the surrogate in the direction relative to the outward view.

12. The mobile telepresence system as claimed in claim 11 wherein:
    the mechanism includes a user motion control for controlling the speed of translation of the surrogate.

13. The mobile telepresence system as claimed in claim 11 additionally comprising:
    a plurality of user's cameras viewing the user;
    a plurality of face display panels on the surrogate displaying an image of the head of the user; and
    a hip line sensor on the user to determine the direction of translation of the surrogate.

14. The mobile telepresence system as claimed in claim 11 wherein:
    the surrogate includes a mechanism for moving an angle of the surrogate's cameras relative to the steerable drive arrangement.

15. The mobile telepresence system as claimed in claim 11 wherein:
    the steerable drive arrangement includes a control for leaving the steerable drive arrangement unchanged from a previous steering direction until a new translation of the surrogate is instructed.

16. A mobile telepresence system for a user comprising:
    a surrogate having a plurality of surrogate's cameras with 360 degrees outward views, the surrogate having a steerable drive arrangement for movement in translation;
    a display screen for displaying the 360 degrees outward views of the surrogate's cameras;
    a sensor for determining the hip line direction of the user; and
    a mechanism responsive to rotation of the hip line direction of the user in a direction perpendicular to an outward view on the display screen and a user translation instruction for turning the steerable drive arrangement over a range of 360 degrees and causing the translation of the surrogate in the direction relative to the outward view perpendicular to the hip line direction of the user.

17. The mobile telepresence system as claimed in claim 16 wherein:
    the mechanism includes a user forward motion control for controlling the speed of translation of the surrogate.

18. The mobile telepresence system as claimed in claim 16 additionally comprising:
   a plurality of user's cameras viewing the user;
   a system for isolating the head of the user;
   a plurality of face display panels on the surrogate displaying an image of the head of the user; and
   a hip line sensor on the user to determine the direction of translation of the surrogate.

19. The mobile telepresence system as claimed in claim 16 wherein:
   the steerable drive arrangement includes a control for leaving the steerable drive arrangement unchanged from a previous steering direction until a new translation of the surrogate is instructed; and
   the steerable drive arrangement includes wheels and a synchronous drive for the wheels.

20. The mobile telepresence system as claimed in claim 16 wherein:
   the steerable drive arrangement includes:
      a plurality of wheels and
      a chain synchronized drive for steering the plurality of wheels; and
   the wheel drive includes a chain synchronized drive for driving the plurality of wheels.

* * * * *